E. P. BAUGH & D. BAUGH.
Improvement in the Treatment of Horns, Hoofs, and other Organic Matters.
No. 129,517.          Patented July 16, 1872.
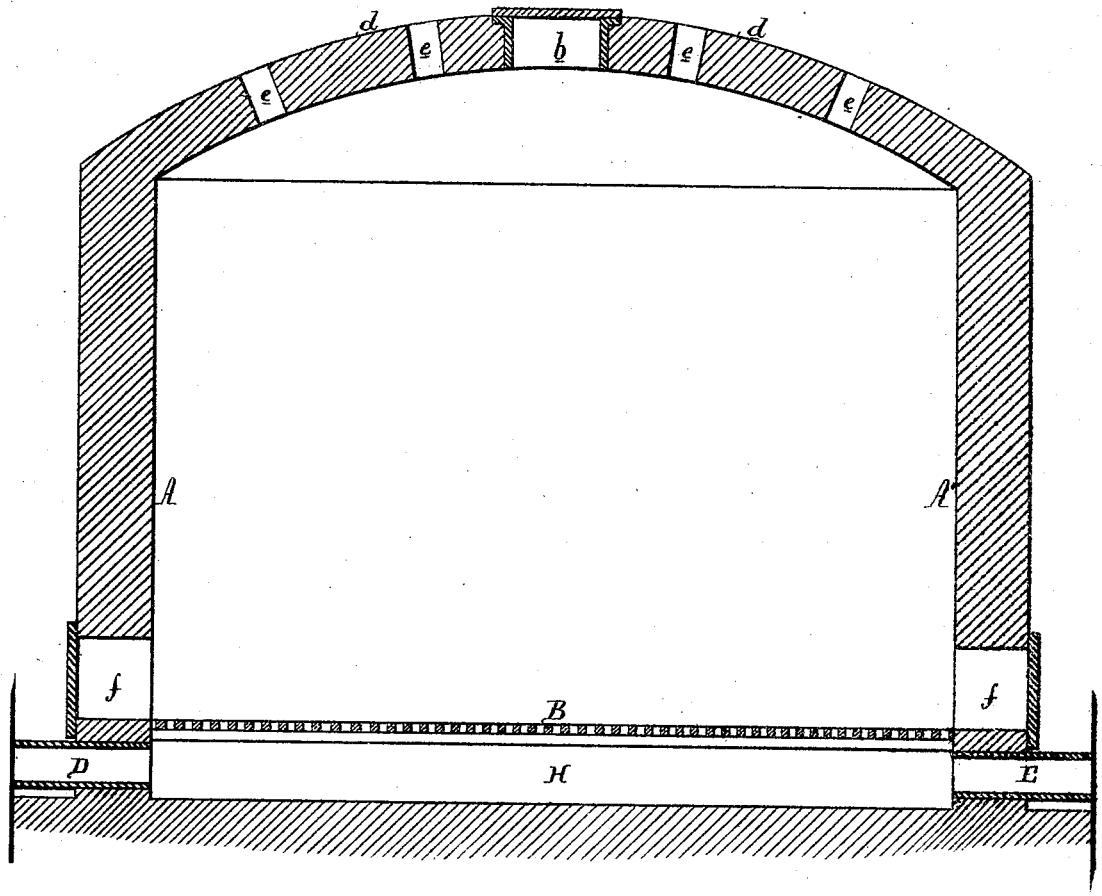

129,517

UNITED STATES PATENT OFFICE.

EDWIN P. BAUGH AND DANIEL BAUGH, OF PHILADELPHIA, PENNSYLVANIA, ASSIGNORS TO BAUGH & SONS, OF SAME PLACE.

IMPROVEMENT IN THE TREATMENT OF HORNS, HOOFS, AND OTHER ORGANIC MATTER.

Specification forming part of Letters Patent No. 129,517, dated July 16, 1872.

Specification describing an Improvement in the Treatment of Horns, Hoofs, and other Organic Offal, invented by EDWIN P. BAUGH and DANIEL BAUGH, both of the city and county of Philadelphia, State of Pennsylvania.

*Treatment of Horns, Hoofs, and other Organic Offal.*

Our invention consists, first, in treating horns, hoofs, and other organic matter with exhaust steam, in a manner too fully described hereafter to need preliminary description. Secondly, of apparatus hereafter described for carrying our invention into effect.

The figure in the accompanying drawing will suffice to illustrate our invention.

Horns, hoofs, leather-scraps, bones, and other organic substances, have heretofore been treated by first subjecting them to the action of steam under pressure in a closed vessel, and subsequently drying them, the substance being thus reduced to a friable condition, which renders disintegration by ordinary grinding-mills easy, and the powdered material being used as manure or as a manure ingredient. We have found that steam under pressure has a tendency to force the glutinous and other adhesive constituents of the horn, hoof, &c., inward into the separate pieces of these substances, and thus in a measure defeat the object aimed at. We have also discovered that exhaust steam has the opposite effect, for if it be permitted to permeate through a mass of horns, hoofs, &c., the glutinous and adhesive constituents are driven outward, and therefore do not obstruct the trituration to such an extent as when they are forced inward. Structures of different forms may be employed in carrying out our invention. The apparatus shown in the drawing, however, has been found serviceable for the purpose, and has, therefore, been selected for illustration.

A and A' are the opposite walls of a brick structure twelve feet square, or thereabout, and across this structure is placed a grating, B, for supporting the material to be treated, this grating being about twelve inches above the floor. The structure has an arched roof, d, through a central opening, b, in which the material is introduced, the opening being furnished with a suitable detachable cover. In the roof are also a number of vent-holes, e e, the aggregate areas of which are sufficient for the free escape of the exhaust steam. In the opposite side walls are openings f f, furnished with suitable doors, and through these openings the material may be properly distributed over the grating, and withdrawn after being subjected to the treatment for a sufficient length of time. Exhaust steam from any adjacent steam-engine is directed to the space below the grating through a pipe, D, and with the same space communicates another pipe, E, for the passage of heated air, or, by preference, the heated products of combustion.

The pipe E being in the first instance closed, steam is admitted to the space H below the grating, and is at liberty to pass through the mass of horns, hoofs, or other organic matter, and finally escapes through the vent-holes e e. After the material has been thus treated with exhaust steam for about a day the pipe D is closed, and the steam is permitted to escape into the air, or is directed to another structure similar to that shown in the drawing. The heated products of combustion are then permitted to enter the structure beneath the grating, and to pass through the mass of horns, hoofs, &c., therein, and to finally escape through the vent-holes e e. About a day will suffice to dry the material and reduce it to a proper friable condition for grinding in an ordinary mill.

It should be understood, however, that the time required both for the steaming and drying processes will, in a great measure, depend upon the size of the structure and the quantity of material to be treated, as well as on the volume of exhaust steam and of heated products of combustion which are available.

Independently of the above-explained superiority of exhaust steam as regards its effect on the material, it is much more economical than steam under pressure.

There are few manure-works, in fact, which do not possess a steam engine and boiler, and not only the exhaust steam from the engine, but the waste products of combustion from the boiler-furnace, instead of being discharged into a chimney may be utilized in carrying our invention into effect.

We claim as our invention—

1. The treating of horns, hoofs, bones, and other organic offal by passing exhaust steam through a mass of the same, substantially in the manner described.

2. The within-described structure with its grating, vent-holes, and doors, in combination with two pipes or passages, one for exhaust steam and the other for the admission of heated products of combustion or heated air, all substantially as set forth.

In testimony whereof we have signed our names to this specification in the presence of two subscribing witnesses.

EDWIN P. BAUGH.
DANIEL BAUGH.

Witnesses:
LOUIS BOSWELL,
JOHN K. RUPERTUS.